(12) United States Patent
Eguchi

(10) Patent No.: US 12,241,232 B2
(45) Date of Patent: Mar. 4, 2025

(54) DISPLAY SYSTEM FOR WORK VEHICLE AND DISPLAY METHOD FOR WORK VEHICLE

(71) Applicant: Komatsu Ltd., Tokyo (JP)

(72) Inventor: Taro Eguchi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 13 days.

(21) Appl. No.: 17/612,094

(22) PCT Filed: Jul. 17, 2020

(86) PCT No.: PCT/JP2020/027853
§ 371 (c)(1),
(2) Date: Nov. 17, 2021

(87) PCT Pub. No.: WO2021/010467
PCT Pub. Date: Jan. 21, 2021

(65) Prior Publication Data
US 2022/0213669 A1    Jul. 7, 2022

(30) Foreign Application Priority Data

Jul. 18, 2019 (JP) ................................ 2019-133074

(51) Int. Cl.
*E02F 9/26* (2006.01)
*B60R 1/27* (2022.01)

(52) U.S. Cl.
CPC ................. *E02F 9/26* (2013.01); *B60R 1/27* (2022.01); *B60R 2300/202* (2013.01); *B60R 2300/301* (2013.01); *B60R 2300/607* (2013.01); *B60R 2300/8093* (2013.01); *B60Y 2200/412* (2013.01)

(58) Field of Classification Search
None
See application file for complete search history.

(56) References Cited

U.S. PATENT DOCUMENTS

| | | | |
|---|---|---|---|
| 2009/0102858 A1* | 4/2009 | Eggers | G06V 20/58 345/617 |
| 2013/0222573 A1 | 8/2013 | Onuma et al. | |
| 2014/0354813 A1 | 12/2014 | Ishimoto | |
| 2017/0021765 A1* | 1/2017 | Mori | B60R 1/00 |
| 2017/0083760 A1* | 3/2017 | Kiyota | H04N 7/18 |
| 2018/0209122 A1 | 7/2018 | Kiyota et al. | |
| 2018/0258616 A1 | 9/2018 | Kiyota et al. | |

FOREIGN PATENT DOCUMENTS

| | | |
|---|---|---|
| CN | 103180522 A | 6/2013 |
| CN | 107925745 A | 4/2018 |
| JP | A-2008-179940 | 8/2008 |

(Continued)

*Primary Examiner* — Rebecca A Volentine
(74) *Attorney, Agent, or Firm* — Fish & Richardson P.C.

(57) ABSTRACT

An image acquisition unit acquires a captured image of surroundings of a work vehicle. A detection unit detects an obstacle around the work vehicle. A display control unit generates a signal for displaying an obstacle-identifying display at a position related to an obstacle having high detection accuracy among a plurality of obstacles detected in a region corresponding to the captured image when the plurality of obstacles is detected by the detection unit, the detection accuracy indicating a certainty of the obstacle.

6 Claims, 13 Drawing Sheets

(56) References Cited

FOREIGN PATENT DOCUMENTS

| | | | |
|---|---|---|---|
| JP | 2009-208676 A | | 9/2009 |
| JP | 2010204821 A | | 9/2010 |
| JP | A-2013-066010 | | 4/2013 |
| JP | 2017074871 A | * | 4/2017 |
| JP | A-2017-074871 | | 4/2017 |
| JP | A-2017-074873 | | 4/2017 |
| JP | A-2017-151815 | | 8/2017 |
| JP | B-6419677 | | 11/2018 |
| JP | B-6662622 | | 3/2020 |

\* cited by examiner

DISPLAY SYSTEM FOR WORK VEHICLE AND DISPLAY METHOD FOR WORK VEHICLE

CROSS-REFERENCE TO RELATED APPLICATIONS

This application is a National Stage application under 35 U.S.C. § 371 of International Application No. PCT/JP2020/027853, filed on Jul. 17, 2020, which claims priority to Japanese Patent Application No. 2019-133074, filed on Jul. 18, 2019. The contents of the prior applications are incorporated herein in their entirety.

TECHNICAL FIELD

The present disclosure relates to a display system for a work vehicle and a display method for a work vehicle.

Priority is claimed on Japanese Patent Application No. 2019-133074, filed Jul. 18, 2019, the content of which is incorporated herein by reference.

BACKGROUND ART

Patent Document 1 discloses a technique related to a periphery monitoring system that detects a person in the periphery of a work vehicle. According to the technique described in Patent Document 1, the periphery monitoring system performs image processing to identify whether or not an image includes a person.

CITATION LIST

Patent Document

Patent Document 1
Japanese Unexamined Patent Application, First Publication No. 2017-151815

SUMMARY OF INVENTION

Technical Problem

In a process of detecting an obstacle such as a person, a plurality of obstacles may be detected from one region. At this time, when all the obstacles detected by the detection process are displayed on a screen, a large amount of detection results are displayed. Therefore, there is a possibility that necessary information cannot be immediately determined.

An object of the present disclosure is to provide a display system for a work vehicle and a display method for a work vehicle capable of reducing the possibility of overlooking necessary information related to detection of an obstacle.

Solution to Problem

According to the first aspect of the present disclosure, a display system for a work vehicle includes: an image acquisition unit configured to acquire a captured image of surroundings of a work vehicle; a detection unit configured to detect an obstacle around the work vehicle; and a display control unit configured to generate a signal for displaying an obstacle-identifying display at a position related to an obstacle having high detection accuracy among a plurality of obstacles detected in a region corresponding to the captured image when the plurality of obstacles are detected by the detection unit, the detection accuracy indicating a certainty of the obstacle.

Advantageous Effects of Invention

According to the above aspect, the display system can reduce the possibility of overlooking necessary information related to detection of an obstacle.

DESCRIPTION OF EMBODIMENTS

First Embodiment

Hereinafter, embodiments will be described in detail with reference to the drawings.

Configuration of Work Vehicle

Figure 1:
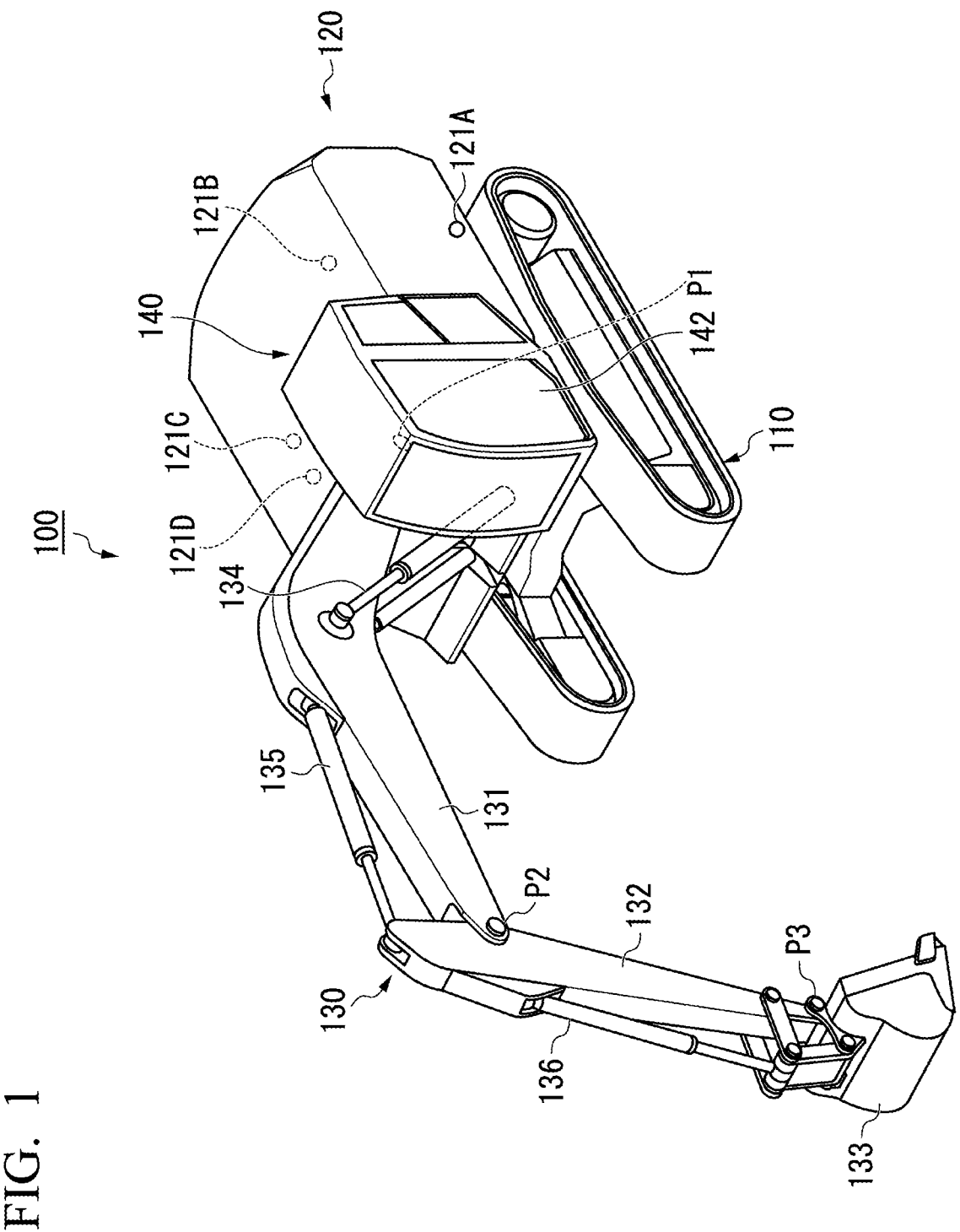
FIG. 1 is a schematic view showing a configuration of a work vehicle according to a first embodiment.

FIG. 1 is a schematic view showing a configuration of a work vehicle according to a first embodiment.

A work vehicle 100 operates at a construction site to construct a construction target such as earth. The work vehicle 100 according to the first embodiment is, for example, a hydraulic excavator. The work vehicle 100 includes an undercarriage 110, a swing body 120, work equipment 130, and a cab 140.

The undercarriage 110 supports the work vehicle 100 so as to be capable of traveling. The undercarriage 110 is, for example, a pair of right and left endless tracks.

The swing body 120 is supported by the undercarriage 110 so as to be swingable around a swing center.

The work equipment 130 is driven by hydraulic pressure. The work equipment 130 is supported by a front portion of the swing body 120 so as to be capable of driving in a vertical direction. The cab 140 is a space in which an operator gets to operate the work vehicle 100. The cab 140 is provided on a left front portion of the swing body 120.

Here, a portion of the swing body 120 to which the work equipment 130 is attached is referred to as a front portion. In addition, in the swing body 120, with reference to the front portion, a portion on an opposite side is referred to as a rear portion, a portion on a left side is referred to as a left portion, and a portion on a right side is referred to as a right portion.

Configuration of Swing Body

Figure 2:
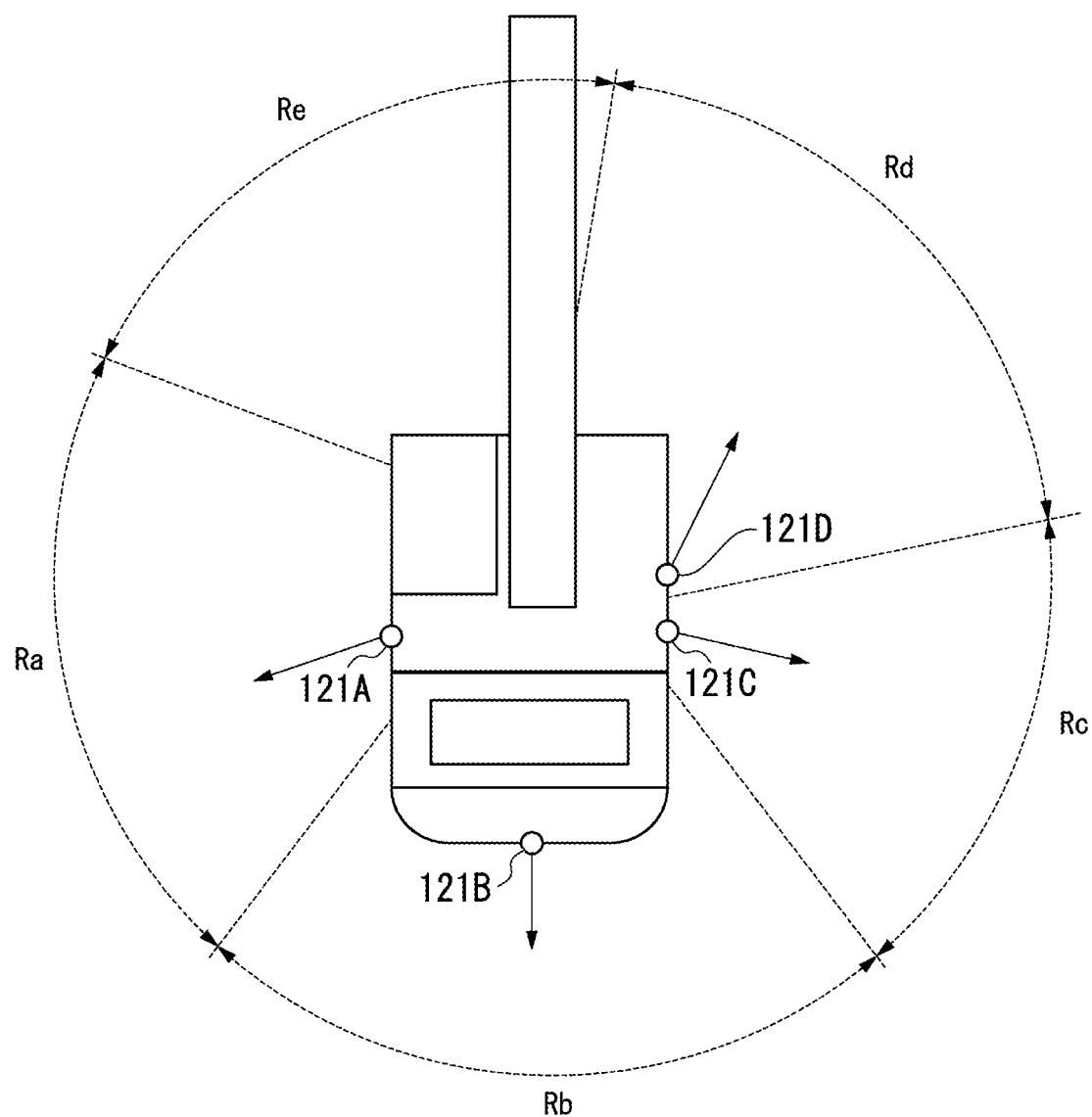
FIG. 2 is a view showing imaging ranges of a plurality of cameras provided in the work vehicle according to the first embodiment.

The swing body 120 is provided with a plurality of cameras 121 that capture images of surroundings of the work vehicle 100. FIG. 2 is a view showing imaging ranges of the plurality of cameras provided in the work vehicle according to the first embodiment. Specifically, the swing body 120 is provided with a left rear camera 121A that captures an image of a left rear range Ra around the swing body 120, a rear camera 121B that captures an image of a rear range Rb around the swing body 120, a right rear camera 121C that captures an image of a right rear range Rc around the swing body 120, and a right front camera 121D that captures an image of a right front range Rd around the swing body 120. Incidentally, the imaging ranges of the plurality of cameras 121 may partially overlap each other.

The imaging ranges of the plurality of cameras 121 cover the entire periphery of the work vehicle 100 excluding a left front range Re visible from the cab 140. Incidentally, the cameras 121 according to the first embodiment capture images of regions on left rear, rear, right rear, and right front sides of the swing body 120, but is not limited thereto in another embodiment. For example, the number of the cameras 121 and the imaging ranges according to another embodiment may differ from the example shown in FIGS. 1 and 2.

Incidentally, as shown by the left rear range Ra in FIG. 2, the left rear camera 121A captures an image of a range of a left side region and a left rear region of the swing body 120, but may capture an image of one region thereof. Similarly, as shown by the right rear range Rc in FIG. 2, the right rear camera 121C captures an image of a range of a right side region and a right rear region of the swing body 120, but may capture an image of one region thereof. Similarly, as shown by the right front range Rd in FIG. 2, the right front camera 121D captures an image of a range of a right front region and the right side region of the swing body 120, but may capture an image of one region thereof.

Configuration of Work Equipment

The work equipment 130 includes a boom 131, an arm 132, a bucket 133, a boom cylinder 134, an arm cylinder 135, and a bucket cylinder 136.

A base end portion of the boom 131 is attached to the swing body 120 via a boom pin P1. The arm 132 connects the boom 131 and the bucket 133. A base end portion of the arm 132 is attached to a tip end portion of the boom 131 via an arm pin P2.

The bucket 133 includes blades to excavate earth, etc. and an accommodating portion to accommodate the excavated earth. A base end portion of the bucket 133 is attached to a tip end portion of the arm 132 via a bucket pin P3.

The boom cylinder 134 is a hydraulic cylinder that operates the boom 131. A base end portion of the boom cylinder 134 is attached to the swing body 120. A tip end portion of the boom cylinder 134 is attached to the boom 131.

The arm cylinder 135 is a hydraulic cylinder that drives the arm 132. A base end portion of the arm cylinder 135 is attached to the boom 131. A tip end portion of the arm cylinder 135 is attached to the arm 132.

The bucket cylinder 136 is a hydraulic cylinder that drives the bucket 133. A base end portion of the bucket cylinder 136 is attached to the arm 132. A tip end portion of the bucket cylinder 136 is attached to a link member connected to the bucket 133.

Configuration of Cab

Figure 3:
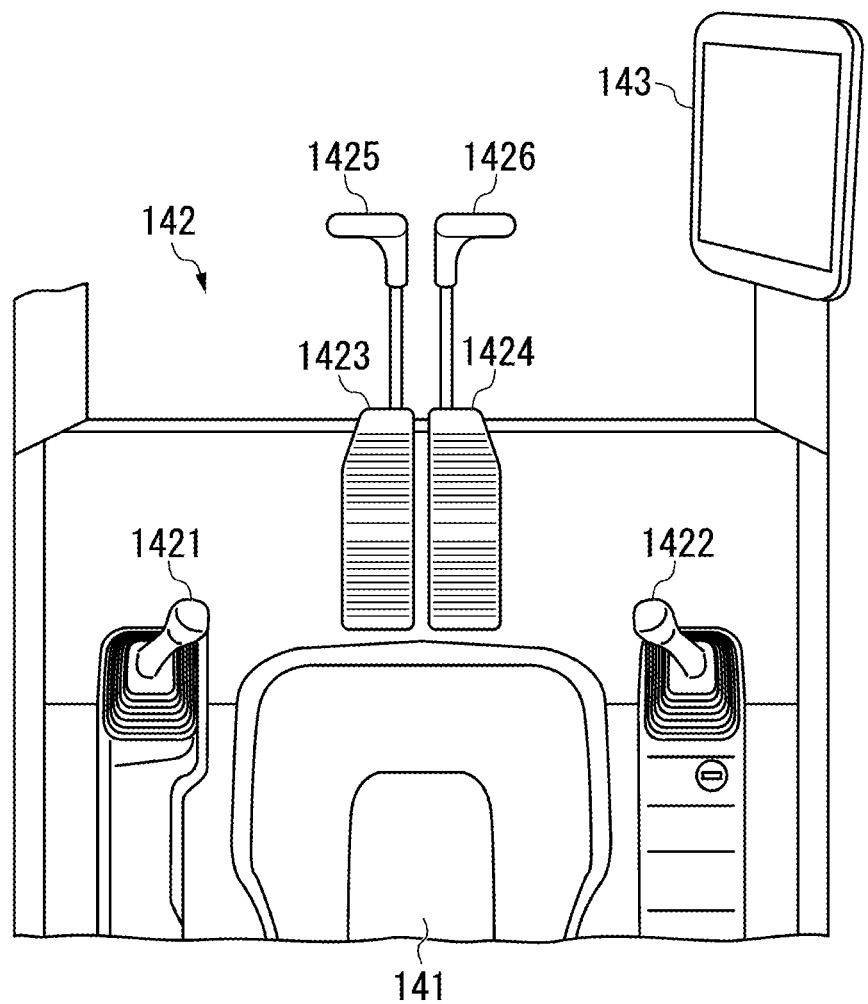
FIG. 3 is a view showing an internal configuration of a cab according to the first embodiment.

FIG. 3 is a view showing an internal configuration of the cab according to the first embodiment.

An operator's seat 141, an operation device 142, and a control device 143 are provided inside the cab 140.

The operation device 142 is an interface that drives the undercarriage 110, the swing body 120, and the work equipment 130 according to a manual operation by the operator. The operation device 142 includes a left operation lever 1421, a right operation lever 1422, a left foot pedal 1423, a right foot pedal 1424, a left traveling lever 1425, and a right traveling lever 1426.

The left operation lever 1421 is provided on a left side of the operator's seat 141. The right operation lever 1422 is provided on a right side of the operator's seat 141.

The left operation lever 1421 is an operation mechanism that causes the swing body 120 to perform a swing operation and causes the arm 132 to perform a pulling or pushing operation. Specifically, when the operator of the work vehicle 100 tilts the left operation lever 1421 forward, the arm 132 performs pushing operation. In addition, when the operator of the work vehicle 100 tilts the left operation lever 1421 backward, the arm 132 performs pulling operation. In addition, when the operator of the work vehicle 100 tilts the left operation lever 1421 in a right direction, the swing body 120 swings rightward. In addition, when the operator of the work vehicle 100 tilts the left operation lever 1421 in a left direction, the swing body 120 swings leftward. Incidentally, in another embodiment, when the left operation lever 1421 is tilted in a front to back direction, the swing body 120 swings rightward or leftward, and when the left operation lever 1421 is tilted in a right to left direction, the arm 132 may perform a dumping operation or an excavating operation.

The right operation lever 1422 is an operation mechanism that causes the bucket 133 to perform an excavating or dumping operation and causes the boom 131 to perform a raising or lowering operation. Specifically, when the operator of the work vehicle 100 tilts the right operation lever 1422 forward, the lowering operation of the boom 131 is executed. In addition, when the operator of the work vehicle 100 tilts the right operation lever 1422 backward, the raising operation of the boom 131 is executed. In addition, when the operator of the work vehicle 100 tilts the right operation lever 1422 in the right direction, the dumping operation of the bucket 133 is performed. In addition, when the operator of the work vehicle 100 tilts the right operation lever 1422 in the left direction, the excavating operation of the bucket 133 is performed.

The left foot pedal 1423 is disposed on a left side of a floor surface in front of the operator's seat 141. The right foot pedal 1424 is disposed on the right side of the floor surface in front of the operator's seat 141. The left traveling lever 1425 is pivotally supported by the left foot pedal 1423 and is configured such that the inclination of the left traveling lever 1425 and the pressing down of the left foot pedal 1423 are linked. The right traveling lever 1426 is pivotally supported by the right foot pedal 1424 and is configured such that the inclination of the right traveling lever 1426 and the pressing down of the right foot pedal 1424 are linked.

The left foot pedal 1423 and the left traveling lever 1425 correspond to rotational drive of a left crawler belt of the undercarriage 110. Specifically, when the operator of the work vehicle 100 tilts the left foot pedal 1423 or the left traveling lever 1425 forward, the left crawler belt rotates in a forward movement direction. In addition, when the operator of the work vehicle 100 tilts the left foot pedal 1423 or the left traveling lever 1425 backward, the left crawler belt rotates in a backward movement direction.

The right foot pedal 1424 and the right traveling lever 1426 correspond to rotational drive of a right crawler belt of the undercarriage 110. Specifically, when the operator of the work vehicle 100 tilts the right foot pedal 1424 or the right traveling lever 1426 forward, the right crawler belt rotates in the forward movement direction. In addition, when the operator of the work vehicle 100 tilts the right foot pedal 1424 or the right traveling lever 1426 backward, the right crawler belt rotates in the backward movement direction.

The control device 143 is an input and output device and is capable of displaying, for example, as an overhead image, a situation around the work vehicle 100 acquired by the plurality of cameras 121. Input means of the control device 143 according to the first embodiment is a hardware key. Incidentally, in another embodiment, a touch panel, a mouse, a keyboard, etc. may be used as the input means.

Configuration of Control Device

Figure 4:
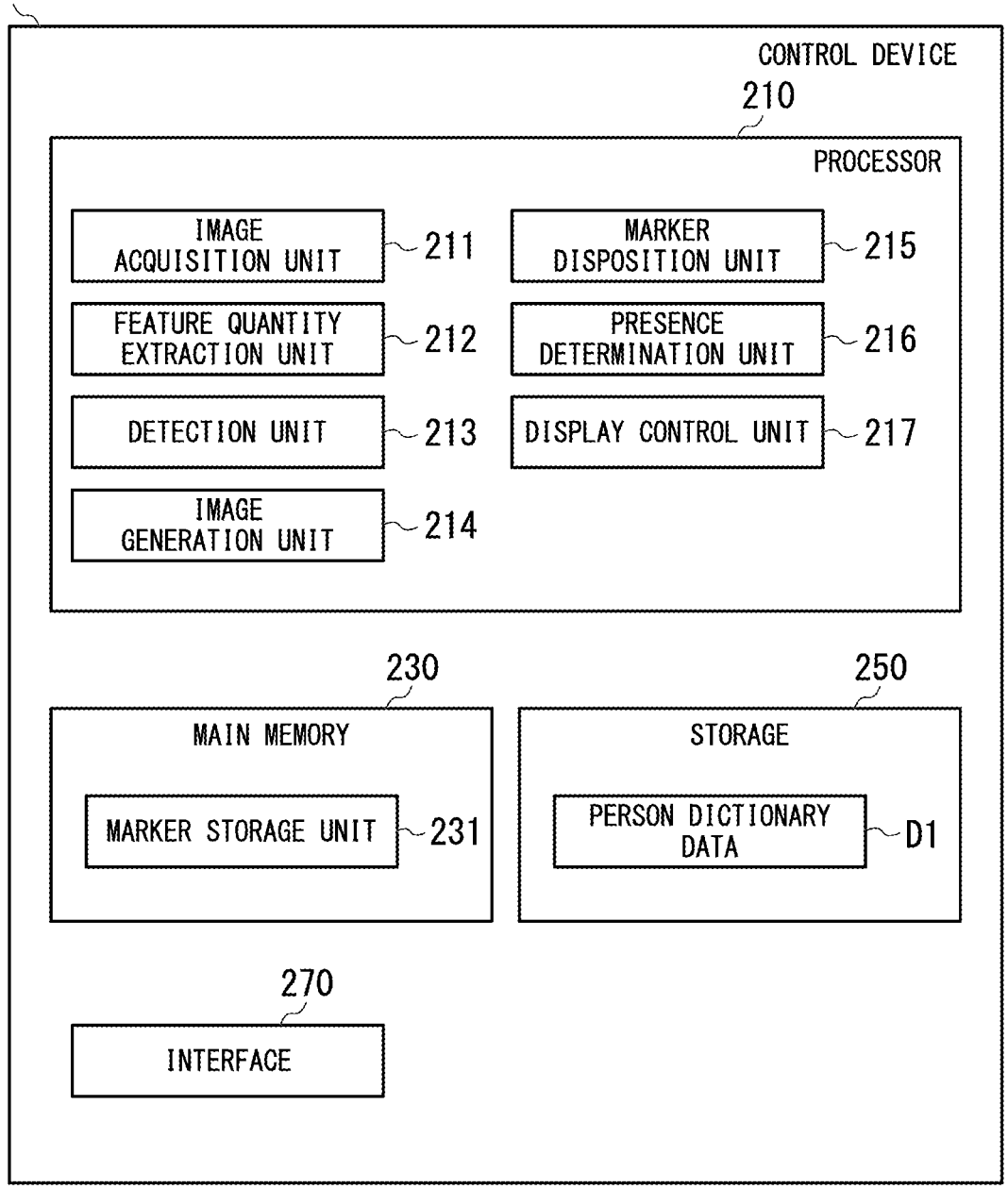
FIG. 4 is a schematic block diagram showing a configuration of a control device according to the first embodiment.

FIG. 4 is a schematic block diagram showing a configuration of the control device according to the first embodiment.

The control device 143 includes a processor 210, a main memory 230, a storage 250, and an interface 270.

The storage 250 is a non-transitory storage medium. Exemplary examples of the storage 250 include a hard disk drive (HDD), a solid state drive (SSD), a magnetic disk, a magneto-optical disk, a compact disc read only memory (CD-ROM), a digital versatile disc read only memory (DVD-ROM), a semiconductor memory, etc. The storage 250 may be an internal medium directly connected to a bus of the control device 143 or may be an external medium to be connected to the control device 143 via the interface 270 or a communication line. The storage 250 stores a program for realizing the monitoring of the surroundings of the work vehicle 100.

The program may realize some of functions to be exhibited by the control device 143. For example, the program may exhibit functions in combination with another program already stored in the storage 250 or in combination with another program installed in another device. Incidentally, in another embodiment, the control device 143 may include a custom large scale integrated circuit (LSI) such as a programmable logic device (PLD) in addition to the above configuration or instead of the above configuration. Exemplary examples of the PLD include a programmable array logic (PAL), a generic array logic (GAL), a complex programmable logic device (CPLD), and a field programmable gate array (FPGA). In this case, some or all of the functions to be realized by the processor may be realized by the integrated circuit.

In addition, the storage 250 stores person dictionary data D1 to detect a person. The person dictionary data D1 is, for example, dictionary data of a feature quantity to be extracted from each of a plurality of known images in which persons are portrayed. As an example of the feature quantity, histograms of oriented gradients (HOG) or Co-occurrence HOG (CoHOG) can be used.

The processor 210 executes the program to function as an image acquisition unit 211, a feature quantity extraction unit 212, a detection unit 213, an image generation unit 214, a marker disposition unit 215, a presence determination unit 216, and a display control unit 217. In addition, a storage region of a marker storage unit 231 is secured in the main memory 230 by executing the program.

The image acquisition unit 211 acquires images from the plurality of cameras 121. The image acquired from each of the cameras 121 is a frame image to be updated at a predetermined frame rate.

The feature quantity extraction unit 212 extracts a feature quantity from the frame images acquired by the image acquisition unit 211. Exemplary examples of the feature quantity to be extracted by the feature quantity extraction unit 212 include a HOG feature quantity, a CoHOG feature quantity, etc.

The detection unit 213 detects a person in the frame images based on the feature quantity extracted by the feature quantity extraction unit 212 and the person dictionary data D1 stored in the storage 250. Exemplary examples of a method for detecting a person include pattern matching, an object detection process based on machine learning, etc. A person is one example of an obstacle. Incidentally, in the first embodiment, the detection unit 213 detects a person using the feature quantity of the image but is not limited thereto. For example, in another embodiment, the detection unit 213 may detect a person based on a measured value of an infrared sensor, etc. The detection unit 213 specifies detection accuracy for each detected person. The detection accuracy is accuracy indicating a certainty of a person, and is expressed as, for example, the similarity or likelihood of a feature quantity.

The image generation unit 214 transforms and combines a plurality of the frame images acquired by the image acquisition unit 211, to generate an overhead image in which a site viewed in a planar view from above and in which the work vehicle 100 is centered. Namely, the image generation unit 214 transforms each of the plurality of frame images into an overhead coordinate system and combines the transformed frame images to generate an overhead image. Incidentally, the image generation unit 214 may cut out a part of each of the transformed frame images and combine the cutout frame images to generate an overhead image. An image in which the work vehicle 100 is viewed in a planar view from above is affixed in advance to the center of the overhead image generated by the image generation unit 214.

The marker disposition unit 215 disposes a marker indicating the position of a person at a position corresponding to the detection position of the person, such that the marker is superimposed on the overhead image generated by the image generation unit 214.

Incidentally, the marker disposition unit 215 according to another embodiment may dispose a marker within a predetermined range from the detection position. Exemplary examples of the shape of the marker include a circular shape, an elliptical shape, a regular polygon shape, a polygon shape, etc. Incidentally, the marker is one example of an obstacle-identifying display. In another embodiment, for example, the obstacle-identifying display may be any obstacle-identifying display such as a display of a text indicating a person, a change in the color of a person, and a change in the shape of a person.

The marker disposition unit 215 records the position of the disposed marker in the marker storage unit 231. The marker storage unit 231 stores the position of the marker disposed in the overhead image.

The marker disposition unit 215 sets a different color for the marker according to a positional relationship between the detection position and a warning range set around the work vehicle 100. For example, the marker disposition unit 215 sets the color of the marker to red when the detection position is within the warning range and sets the color of the marker to yellow color when the detection position is outside the warning range. The warning range may be set as, for example, a circle having the swing center of the work vehicle 100 as a center.

Incidentally, the color of the marker and the relationship between the position and the color of the marker are not limited thereto. For example, the marker disposition unit 215 according to another embodiment may set a color other than red and yellow colors for the marker. In addition, the marker disposition unit 215 according to another embodiment may set the color of the marker to red when the detection position is within the warning range, set the color of the marker to yellow color when the detection position is outside the warning range but within a caution range, and set the color of the marker to gray color when the detection position is outside the caution range. In addition, when the detection position is within the warning range or the caution range, the color of the marker may be set to red. In addition, the color of the marker may be set to red regardless of the detection position. The caution range may be set as, for example, a circle having the swing center of the work vehicle 100 as a center and a range outside the warning range.

In addition, the marker disposition unit 215 may highlight a region including the detection position of a person, together with the disposition of the marker in the overhead image. The region is determined by the imaging ranges of the plurality of cameras 121. Incidentally, the region may be determined by an imaging range of one camera 121 or may be determined by imaging ranges of at least two cameras 121. In addition, the region may be narrower than the imaging range. Exemplary examples of the highlighting include, for example, displaying a frame of the region as a thick red frame. Incidentally, the highlighting is not limited to the above example, and may be done with a color other than red color. In addition, the highlighting may be done by blinking the frame of the region.

In addition, only when the detection position is within the warning range or the caution range, the marker disposition unit 215 may highlight a region including the position. In this case, a marker is disposed on the detected person and a region corresponding to the detection position is highlighted, so that the operator can easily figure out the person to which caution has to be given, and a direction. Namely, the control device 143 is capable of encouraging the operator to exercise caution.

The presence determination unit 216 determines whether or not a person is present inside the caution range or the warning range set around the work vehicle 100, based on the detection position in the overhead coordinate system.

The display control unit 217 attaches an icon corresponding to a determination result of the presence determination unit 216 to the overhead image in which the marker is disposed, to generate a monitoring image. The display control unit 217 outputs the generated monitoring image to a touch panel. The form of the icon is set differently between, for example, when a person is not present within the caution range, when a person is present within the caution range but outside the warning range, and when a person is present within the warning range. Exemplary examples of the form of the icon include color, transparency, size, etc.

Operation of Control Device

Figure 5:
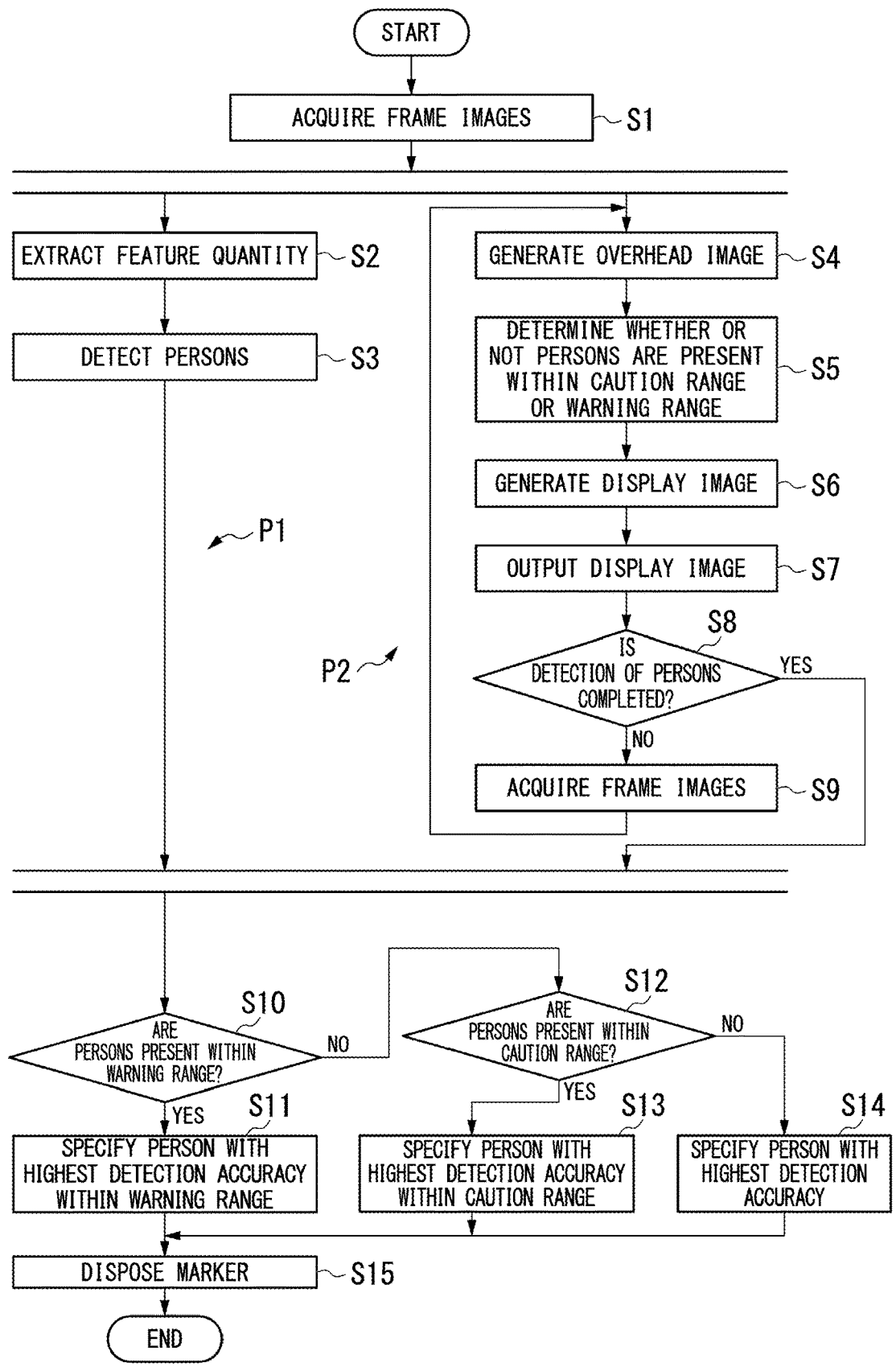
FIG. 5 is a flowchart showing operation of the control device according to the first embodiment.

FIG. 5 is a flowchart showing operation of the control device according to the first embodiment.

When the control device 143 starts a process of monitoring the surroundings, the image acquisition unit 211 acquires frame images from the plurality of cameras 121 (step S1). Next, the control device 143 executes a person detection process P1 and a display control process P2 in parallel based on the acquired frame images.

The person detection process P1 is a process from step S2 to step S3 below.

The feature quantity extraction unit 212 extracts a feature quantity from the frame images acquired in step S1 (step S2). Next, the detection unit 213 reads the person dictionary data D1 from the storage 250 and compares the extracted feature quantity with the person dictionary data D1 to specify detection positions at which persons are present in the frame images (step S3). The person detection process P1 has a larger amount of calculation than the display control process P2.

The display control process P2 is a process from step S4 to step S9 below.

The image generation unit 214 generates an overhead image based on the frame images acquired in step S1 (step S4). Next, the presence determination unit 216 determines whether or not the persons are inside the caution range or the warning range, based on the position of the marker stored in the marker storage unit 231 (step S5).

The display control unit 217 draws a marker for the position and the size stored in the marker storage unit 231, on the overhead image generated in step S4, and attaches an icon corresponding to a determination result in step S5 at a position corresponding to the left front range Re in the overhead image to generate a monitoring image (step S6). The display control unit 217 outputs the generated monitoring image to the touch panel (step S7).

Next, the display control unit 217 determines whether or not the person detection process P1 is completed (step S8). When the person detection process P1 is not completed (step S8: NO), the image acquisition unit 211 acquires next frame images from the plurality of cameras 121 (step S9), and the process returns to step S4.

When the person detection process P1 and the display control process P2 are completed, the presence determination unit 216 determines whether or not persons are present inside the warning range in each of the frame images that have become detection targets in the person detection process P1, based on the detection positions related to the result of the detection process in step S3 (step S10). For a frame image in which persons are present inside the warning range (step S10: YES), the marker disposition unit 215 specifies one detection position within the warning range, the one detection position being related to a person with the highest detection accuracy indicated by the detection result (step S11).

For a frame image in which persons are not present inside the warning range (step S10: NO), the presence determination unit 216 determines whether or not the persons are present inside the caution range, based on the detection positions related to the result of the detection process in step S3 (step S12). For a frame image in which persons are inside the caution range (step S12: YES), the marker disposition unit 215 specifies one detection position within the caution range, the one detection position being related to a person with the highest detection accuracy indicated by the detection result (step S13). For a frame image in which persons are not present within the warning range and the caution range (step S12: NO), the marker disposition unit 215 specifies a person with the highest detection accuracy indicated by the detection result (step S14).

Then, the marker disposition unit 215 disposes a marker at the detection position of the person specified in any one of step S10 to step S14 in each of the frame images that have become detection targets in the person detection process P1. Namely, the marker disposition unit 215 records information of the marker at a position corresponding to the detection position in the marker storage unit 231 (step S15), and the control device 143 ends a periphery monitoring process.

Incidentally, the marker disappears when a certain period of time has elapsed from the disposition of the marker. Namely, the marker disposition unit 215 deletes information of the corresponding marker from the marker storage unit 231 when a certain period of time has elapsed from the disposition of the marker. Incidentally, the marker disposition unit 215 according to another embodiment may delete a marker when the marker reaches a predetermined size or larger. In addition, in this case, the marker disposition unit 215 may determine the color of the marker based on a relationship between the detection position and the warning range. Accordingly, the number of markers for each of regions corresponding to a plurality of frame images can be suppressed to 1 or less in an overhead image.

Incidentally, the person detection process P1 may be executed on the plurality of frame images in parallel or may be executed on the frame images in order. In addition, when a marker related to a person extracted from other frame images is already at the detection position, the marker disposition unit 215 may not dispose a marker at the detection position. Accordingly, the overlapping disposition of markers which makes it difficult to see the markers can be prevented. In addition, when the person detection process P1 is executed on the frame images in order, a process from step S10 to S15 is performed only on a frame image to be targeted by the person detection process P1.

Incidentally, the flowchart shown in FIG. 5 is one example, and in another embodiment, all the steps may not be necessarily executed. For example, in another embodiment, any one of step S2, steps S5 to S9, and steps S10 to S13 may not be executed.

Example of Display Image

FIGS. 6 to 9 are examples of display images according to the first embodiment.

According to FIGS. 6 to 9, in the display images, a monitoring image G1 generated by the display control unit 217 and a single camera image G2 are displayed. In addition, each of the display images include a work mode indicator G32, a service meter reading (SMR) indicator G33, a fuel level indicator G34, a hydraulic oil temperature indicator G35, and an engine coolant temperature indicator G36. The monitoring image G1 includes an overhead image G11, a region frame G12 indicating the caution range, a region frame G13 indicating the warning range, a plurality of markers G14, and an icon G15. The single camera image G2 is a frame image captured by one of the plurality of cameras 121.

In addition, FIGS. 6 to 9 show a detection position E that is not displayed in the display images but is not specified in a process from step S10 to step S14. In addition, FIGS. 6 to 9 show frame regions F1, F2, F3, and F4 that are not displayed in the display images. The frame region F1 is a frame region corresponding to the left rear range Ra of which an image is to be captured by the left rear camera 121A. The frame region F2 is a frame region corresponding to the rear range Rb of which an image is to be captured by the rear camera 121B. The frame region F3 is a frame region corresponding to the right rear range Rc of which an image is to be captured by the right rear camera 121C. The frame region F4 is a frame region corresponding to the right front range Rd of which an image is to be captured by the right front camera 121D. Incidentally, the overhead image G11 is not generated for a front and left front frame region F0. The reason is that the operator can directly see a region in front of and on a left front side of the cab 140.

Figure 6:
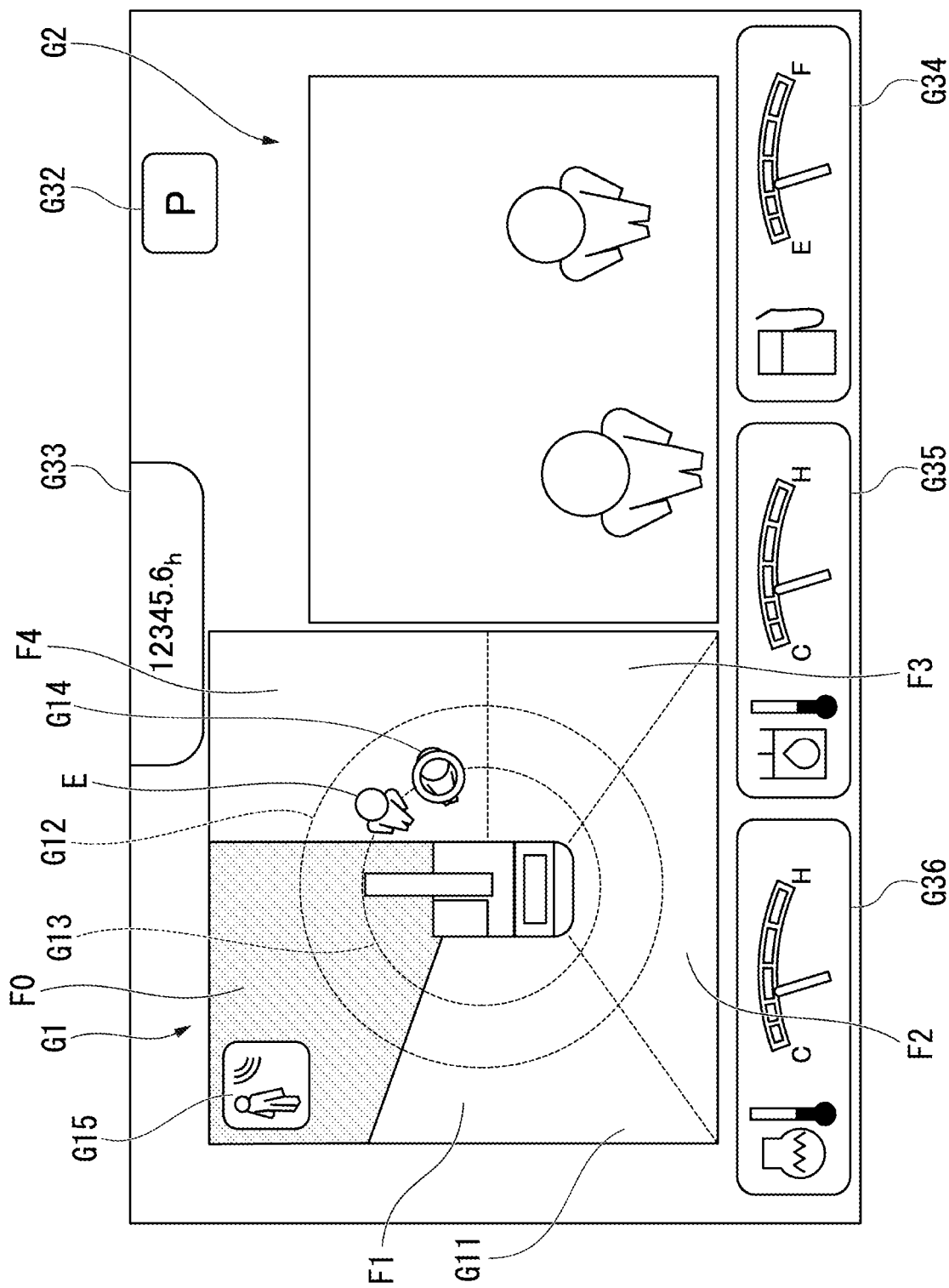
FIG. 6 is an example of a display image according to the first embodiment.

FIG. 6 shows a case where one or more persons are present within the warning range of the work vehicle and shows an example of a display image in which a frame image captured by the right front camera 121D is displayed in the single camera image G2. According to FIG. 6, when one or more persons are detected within the warning range, the marker G14 is attached only at a detection position related to a person with the highest detection accuracy. Accordingly, the operator can recognize the person to which special caution has to be given among persons in a short distance. Incidentally, FIG. 6 shows an example in which one or more persons are present within the warning range, and even when no person is present within the warning range and one or more persons are present within the caution range, the same above result is obtained. Incidentally, the one or more persons may be one person or may be a plurality of persons.

Figure 7:
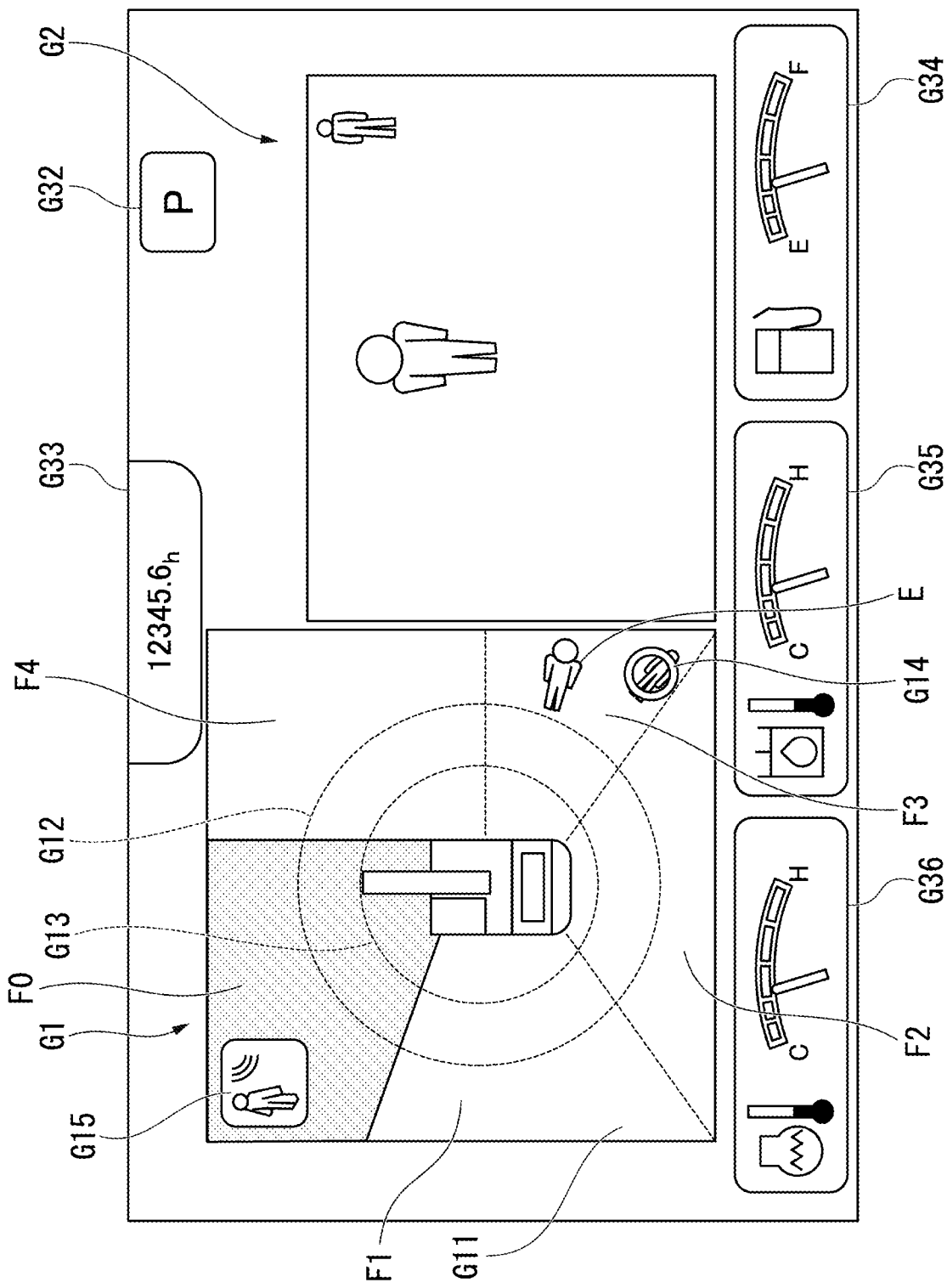
FIG. 7 is an example of a display image according to the first embodiment.

FIG. 7 shows a case where one or more persons are present outside the caution range and shows an example of a display image in which a frame image captured by the right rear camera 121C is displayed in the single camera image G2. According to FIG. 7, when one or more persons are detected outside the caution range, the marker G14 is attached only at a detection position related to a person with the highest detection accuracy. Accordingly, when no person is present in a short distance, the operator can recognize the person to which special caution has to be given. Incidentally, the one or more person may be one person or may be a plurality of persons.

Figure 8:
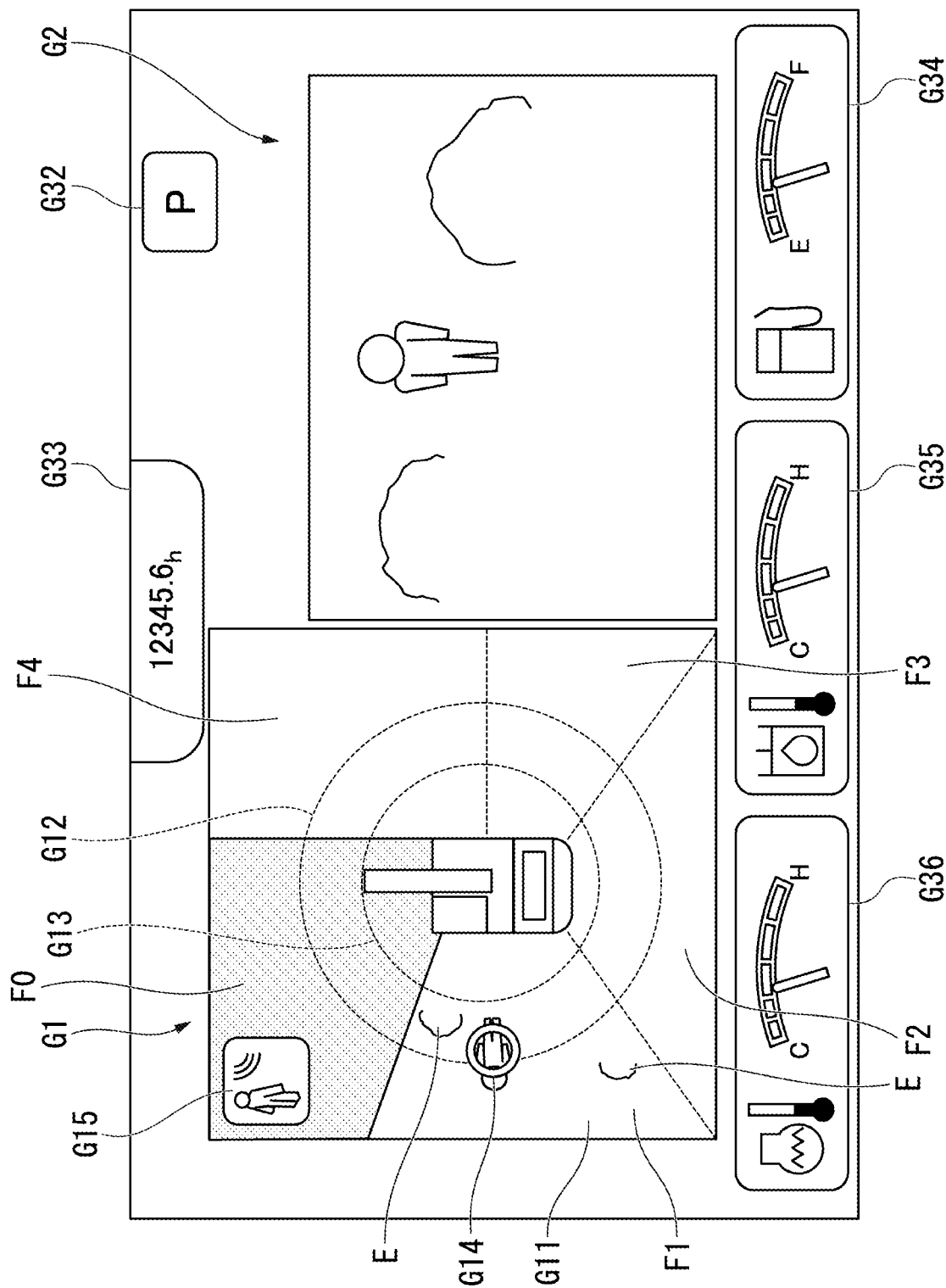
FIG. 8 is an example of a display image according to the first embodiment.

FIG. 8 shows a case where one or more persons are present within the caution range and objects are present within the caution range and outside the caution range, and shows an example of a display image in which a frame image captured by the left rear camera 121A is displayed in the single camera image G2. According to FIG. 8, when one or more persons are detected within the caution range and a person is detected outside the caution range because of an object being falsely detected as a person, the marker G14 is attached only at a detection position related to a person with the highest detection accuracy within the caution range. When a person and an object are compared with each other, generally, the detection accuracy of the person is higher, so that the marker G14 is attached at the position of the person instead of the object. Accordingly, the operator can recognize the person to which special caution has to be given.

In addition, since the marker G14 is attached only to the person with the highest detection accuracy among a plurality of the detected persons, the marker G14 can be prevented from being attached at a position related to false detection. In addition, even when a person is detected outside the caution range, the marker G14 is attached only to a person within the caution range, so that markers can be prevented from causing troublesomeness, and necessary information can be immediately determined. Incidentally, FIG. 8 shows an example in which one or more persons and objects are present within the caution range, and even when one or more persons and objects are present within the warning range, the same above result is obtained. Incidentally, the one or more persons may be one person or may be a plurality of persons.

Figure 9:
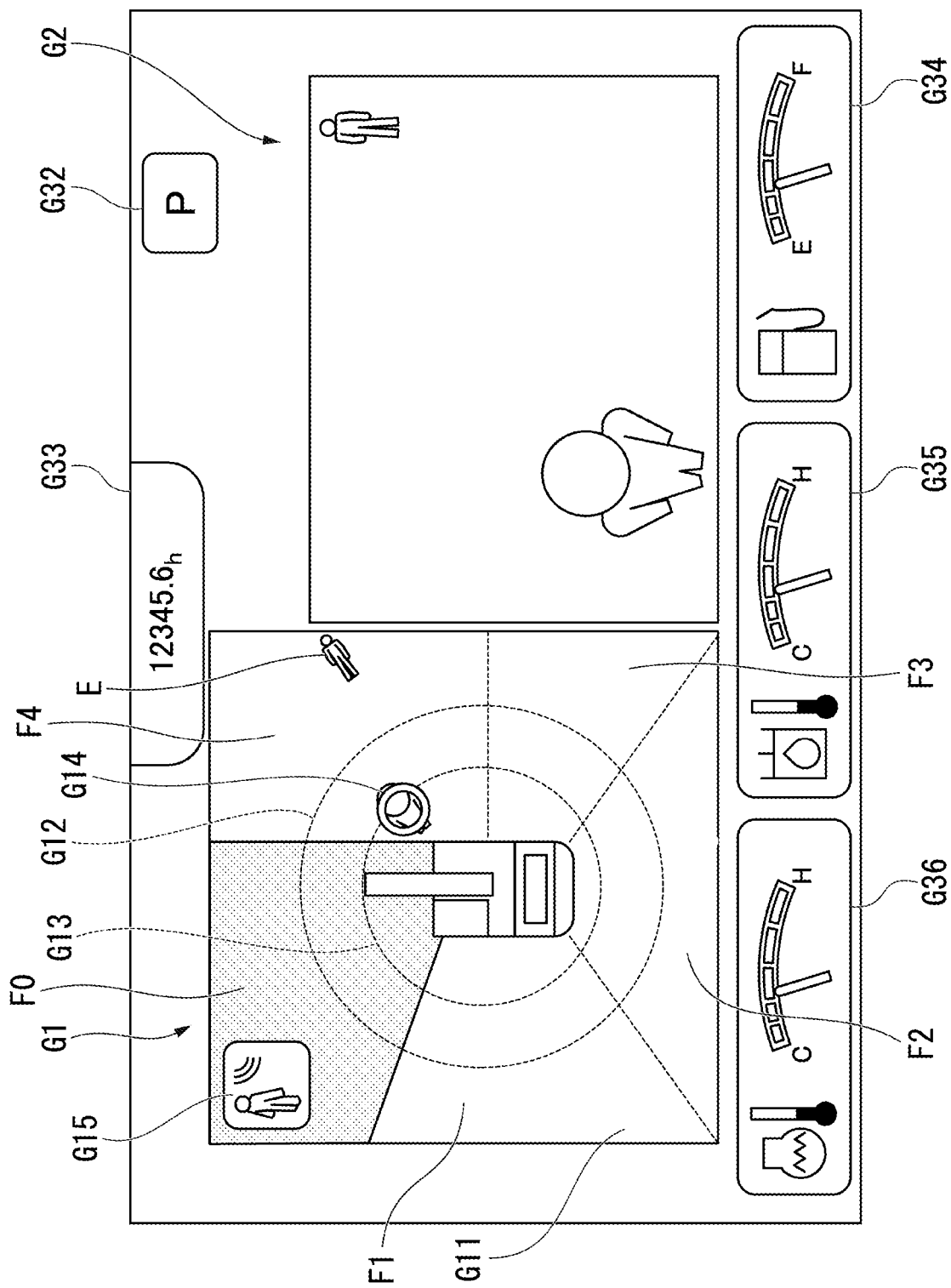
FIG. 9 is an example of a display image according to the first embodiment.

FIG. 9 shows a case where one or more persons are present within the warning range and one or more persons are present outside the caution range and shows an example of a display image in which a frame image captured by the right front camera 121D is displayed in the single camera image G2. According to FIG. 9, when one or more persons are present within the warning range and one or more persons are present outside the caution range, the marker G14 is attached only at a detection position related to a person with the highest detection accuracy within the warning range. Even if a person present outside the caution range has a higher detection accuracy than that of a person within the warning range, the marker G14 is attached only to a person with the highest detection accuracy within the warning range. Accordingly, the operator can recognize the person to which special caution has to be given when a plurality of persons is detected. In addition, markers can be prevented from causing troublesomeness, and necessary information can be immediately determined. Incidentally, the one or more persons may be one person or may be a plurality of persons.

When the work vehicle is keyed on, a frame image captured by the rear camera 121B is to be displayed as the single camera image G2. The single camera image G2 can be switched to a frame image captured by another camera 121 by the input means of the control device 143. Incidentally, a frame image captured by one of the cameras 121 other than the rear camera 121B may be used as the single camera image G2 to be displayed at key-on. In addition, when a person is detected, the single camera image G2 may be automatically switched to a frame image of the camera 121 that captures an image of the person.

Effects

As described above, when a plurality of obstacles are detected in the process of detecting obstacles portrayed in captured images, the control device 143 according to the first embodiment causes a display image to be displayed, in which markers are disposed at positions related to a predetermined number of obstacles having the highest detection accuracy. Accordingly, the number of markers in the display image can be reduced, and a possibility that necessary information related to the detection of the obstacles is overlooked can be reduced.

In addition, when a plurality of obstacles is detected within a predetermined range around the work vehicle 100, the control device 143 according to the first embodiment causes to display a display image in which markers are disposed at positions related to a predetermined number of obstacles having the highest detection accuracy within the range. Accordingly, even when an obstacle far away from an obstacle in the vicinity of the work vehicle has a higher detection accuracy, the obstacle in the vicinity can be notified with priority. Incidentally, in another embodiment, the invention is not limited thereto. For example, the control device 143 according to another embodiment may cause a display image to be displayed, in which markers are disposed at positions related to a predetermined number of obstacles having the highest detection accuracy regardless of the caution range and the warning range.

Other Embodiments

One embodiment has been described above in detail with reference to the drawings; however, the specific configuration is not limited to the above-described configuration, and various design changes, etc. can be made. In another embodiment, the order of the above-described processes may be appropriately changed. In addition, some of the processes may be executed in parallel.

In the above-described embodiment, the work vehicle 100 has been described as being a hydraulic excavator; however, in another embodiment, the invention is applicable to various work vehicles such as dump trucks and wheel loaders. For example, the invention is applicable to a display system for dump trucks, wheel loaders, or other work vehicles.

In addition, in the above-described embodiment, one control device 143 has been described as being installed in the work vehicle; however, in another embodiment, a part of the configuration of the control device 143 may be disposed in other control devices, and the invention may be realized by a display system formed of two or more control devices. Incidentally, one control device 143 shown in the above-described embodiment is also one example of a display system.

The control device 143 according to the above-described embodiment has been described as being installed in the work vehicle; however, in another embodiment, a part or the entirety of the configuration of the control device 143 may be installed outside the work vehicle.

In addition, the control device 143 according to the above-described embodiment detects a person but may detect an obstacle other than a person.

In addition, the control device 143 according to the above-described embodiment does not include a left front camera that captures an image of the left front range Re but may include a left front camera that captures an image of the left front range Re in another embodiment. In this case, the control device 143 is capable of generating an overhead image in which the entire periphery around the work vehicle 100 is portrayed. On the other hand, also in this case, the control device 143 may not detect a person from a frame image of the left front camera in the person detection process P1. This technique aims to preventing an increase in overall calculation load by not performing the person detection process P1 in a range in which the necessity for monitoring by the control device 143 is low, since the amount of calculation of the person detection process P1 is large.

In addition, the control device 143 according to the above-described embodiment specifies one detection position having the highest detection accuracy for each frame image but is not limited thereto. For example, in another embodiment, a predetermined number of detection positions of two or more may be specified in descending order of detection accuracy. In addition, for example, in another embodiment, a predetermined number of detection positions with high detection accuracy may be specified for all frame images (the left rear range Ra, the rear range Rb, the right rear range Rc, and the right front range Rd), or a predetermined number of detection positions with high detection accuracy may be specified for each of combinations of frame images (for example, a combination of the left rear range Ra and the rear range Rb and a combination of the right rear range Rc and the right front range Rd).

In addition, the control device 143 according to the above-described embodiment causes a detection result to be displayed so as to encourage an operator to exercise caution; however, in another embodiment, the control device may control the work vehicle 100 based on a detection result of the control device 143. For example, the control device may perform control to prohibit the travelling and swing of the work vehicle 100 and operation of the work equipment when a marker is disposed within a warning range. In this case, the number of markers is reduced as in the above-described embodiment, so that stop control of the work vehicle 100 caused by false detection can be prevented.

The control device 143 according to the above-described embodiment includes a display, and cause to display a display image on the display but is not limited thereto in another embodiment. For example, the control device 143 according to another embodiment may not include a display and may transmit a signal for displaying a display image on a display separate from the control device 143. The signal is a signal for displaying a display image in which a marker is disposed at a position related to an obstacle. Incidentally, the invention may be realized by a display system formed of a display separate from the control device 143, and two or more control devices each including a part of the configuration of the control device 143 described above.

In addition, in the above-described embodiment, each of the warning range and the caution range has been described as being set as a circle having the swing center of the work vehicle as a center, but in another embodiment, may be a range other than a circle which has the swing center of the work vehicle 100 as a center. For example, each of the warning range and the caution range may be a range obtained by partially extending a circle in directions of a front portion, a rear portion, a left portion, and a right portion of the circle by a predetermined distance, the circle having the swing center of the work vehicle 100 as a center. In addition, each of the warning range and the caution range may be set as a circle having a portion other than the swing center of the work vehicle 100 as a center. In addition, each of the warning range and the caution range may be a range obtained from an operation range of the work equipment 130. In addition, each of the warning range and the caution range may be a range formed of an ellipse, a polygon, or straight lines and curved lines.

In addition, in the above-described embodiment, the display has been described as being installed in the work vehicle 100; however, in another embodiment, the display may be installed outside the work vehicle 100. For example, a display may be provided at a point away from a work site, and the control device 143 may transmit a signal for displaying a display image on the display via a network such as the Internet.

In addition, in the above-described embodiment, the warning range and the caution range have been described as being set; however, in another embodiment, one range of the warning range and the caution range may be set. In addition, three or more ranges may be set.

In addition, in the above-described embodiment, the marker G14 is attached to the overhead image G11 but is not limited thereto. For example, in another embodiment, the markers G14 may be attached to both of the overhead image G11 and the single camera image G2, or the marker G14 may be attached only to the single camera image G2. At this time, the markers G14 may be attached at a predetermined number of detection positions having high detection accuracy in both of the overhead image G11 and the single camera image G2. In addition, the markers G14 may be attached only at a predetermined number of detection positions having high detection accuracy in one image of the overhead image G11 and the single camera image G2, and the markers G14 may be attached at all detection positions in the other image.

In addition, in another embodiment, a display image may include only one of the overhead images G11 and the single camera image G2. In this case, the marker G14 is attached to the overhead image G11 or the single camera image G2 included in the display image. In addition, in another embodiment, the single camera images G2 captured by the plurality of cameras 121 may be displayed side by side. In this case, the marker G14 may be attached to one single camera image G2, or the markers G14 may be attached to two or more single camera images.

Here, an example will be described in which the control device 143 generates a display image including the single camera image G2 to which the marker G14 is attached.

Figure 10:
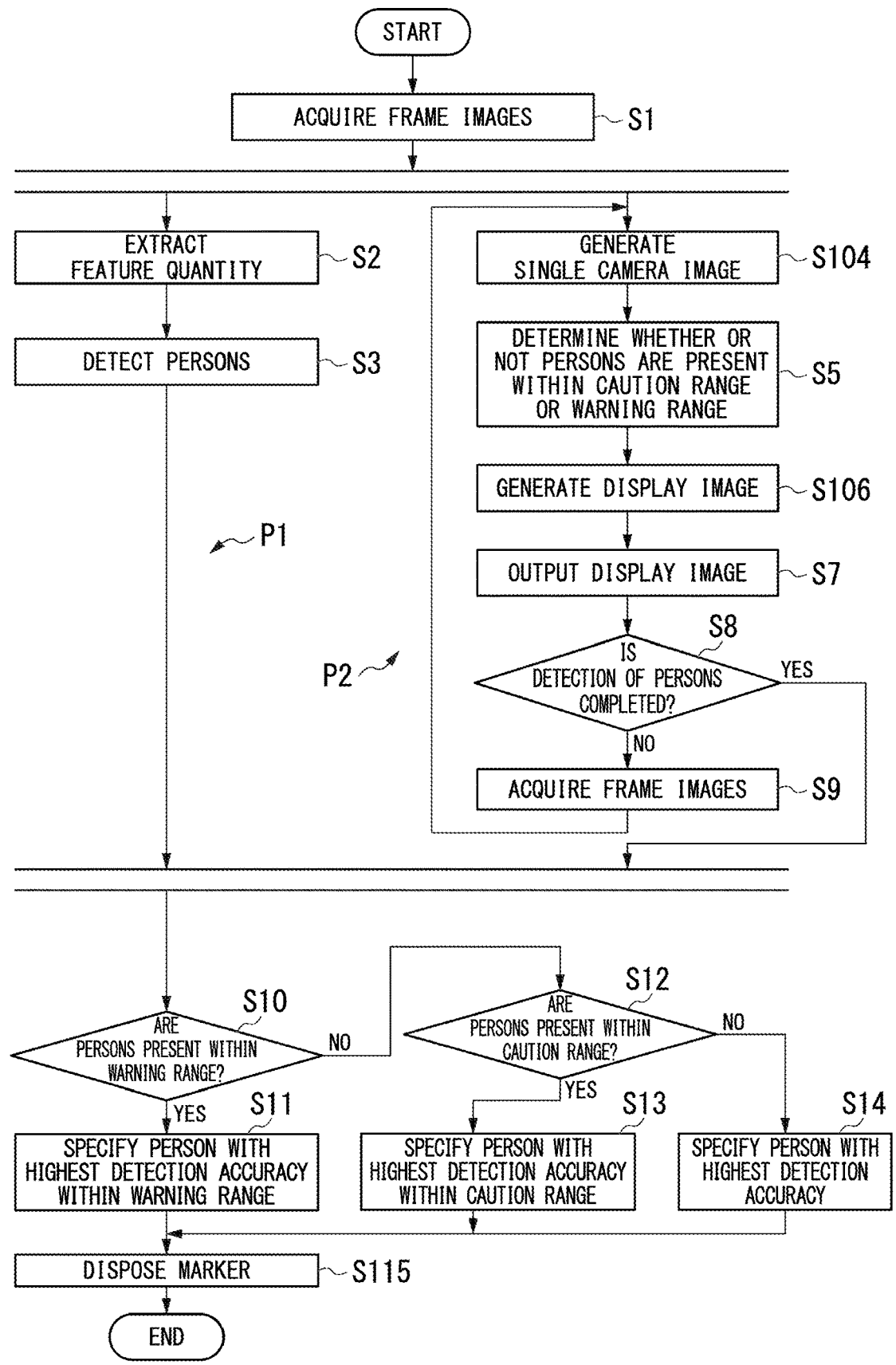
FIG. 10 is a flowchart showing operation of the control device according to another embodiment.

FIG. 10 is a flowchart showing operation of the control device according to another embodiment. In another embodiment, the control device 143 executes step S104, step S106, and step S115 instead of step S4, step S6, and step S15 in the first embodiment.

In step S104, the image generation unit 214 of the control device 143 generates a single camera image based on a frame image acquired in step S1.

In step S106, the display control unit 217 of the control device 143 draws a marker for the position stored in the marker storage unit 231, on the single camera image generated in step S104, and attaches an icon corresponding to a determination result in step S5 to the single camera image to generate a display image. The icon is disposed at a position at which the necessity for monitoring is low, such as a region in which a part of the work vehicle 100 is shown, in the single camera image, so that the icon can be prevented from covering a person present at a position at which the necessity for monitoring by the control device 143 Is high. In step S115, the marker disposition unit 215 of the control device 143 disposes a marker at a detection position related to a result of the detection process in step S3. Namely, the marker disposition unit 215 records information of the marker at the detection position in the marker storage unit 231.

Figure 11:
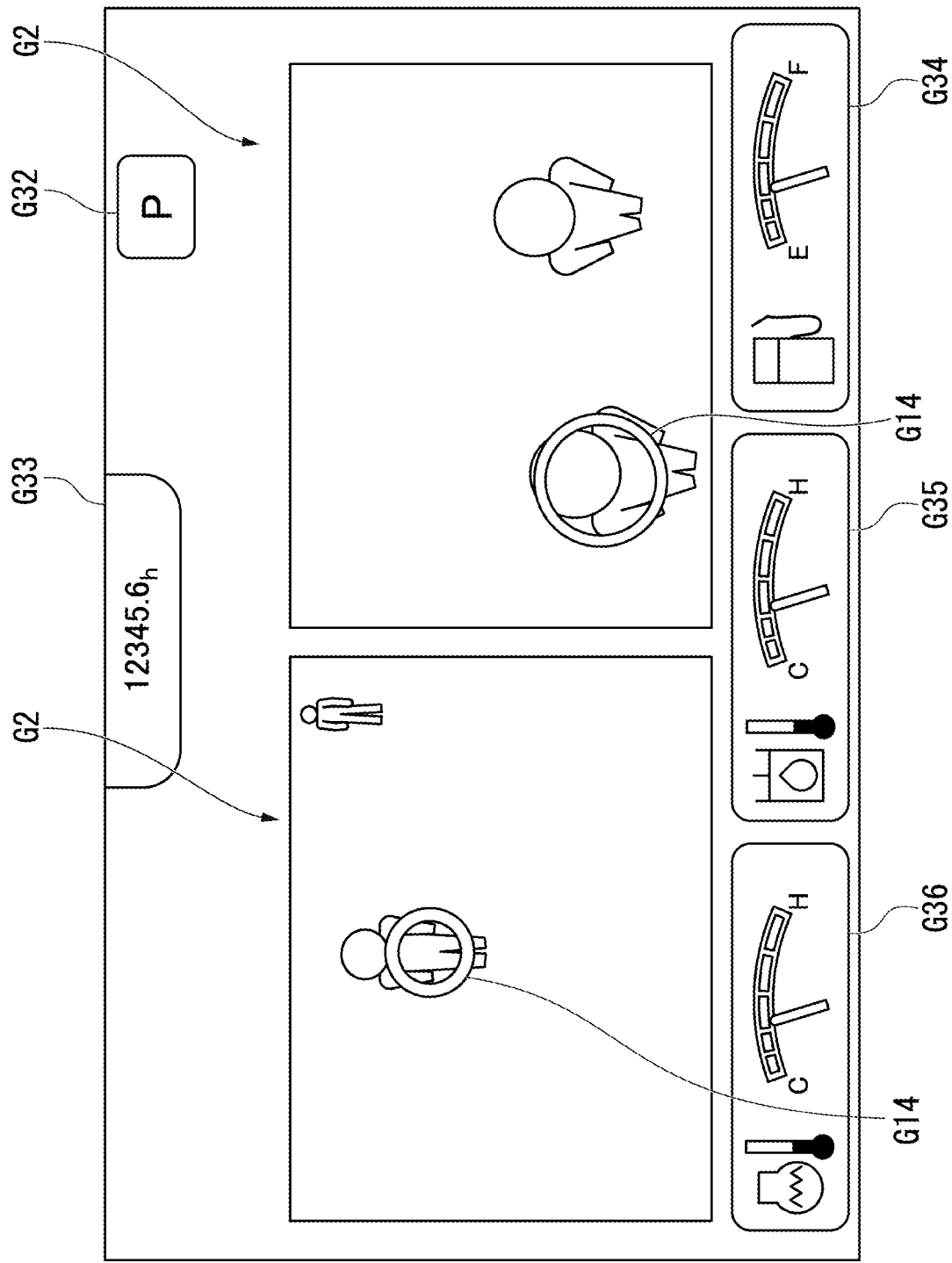
FIG. 11 is an example of a display image according to another embodiment.

FIG. 11 is an example of a display image according to another embodiment.

According to FIG. 11, the display image includes two single camera images G2 captured by different cameras 121. One marker G14 is attached to each of the single camera images G2. Incidentally, in the example shown in FIG. 11, for each of the two single camera images G2, a predetermined number of detection positions with high detection accuracy are specified, and the markers G14 are attached at the detection positions; however, the invention is not limited thereto. For example, in another embodiment, for one of two single camera images G2, a predetermined number of detection positions with high detection accuracy may be specified and the markers G14 may be attached at the detection positions, and for the other, the marker G14 may not be attached. In addition, in another embodiment, for one of two single camera images G2, a predetermined number of detection positions with high detection accuracy may be specified and the markers G14 may be attached at the detection positions, and for the other, the markers G14 may be attached at all the detection positions. In addition, in another embodiment, a display image may include three or more single camera images G2.

Figure 12:
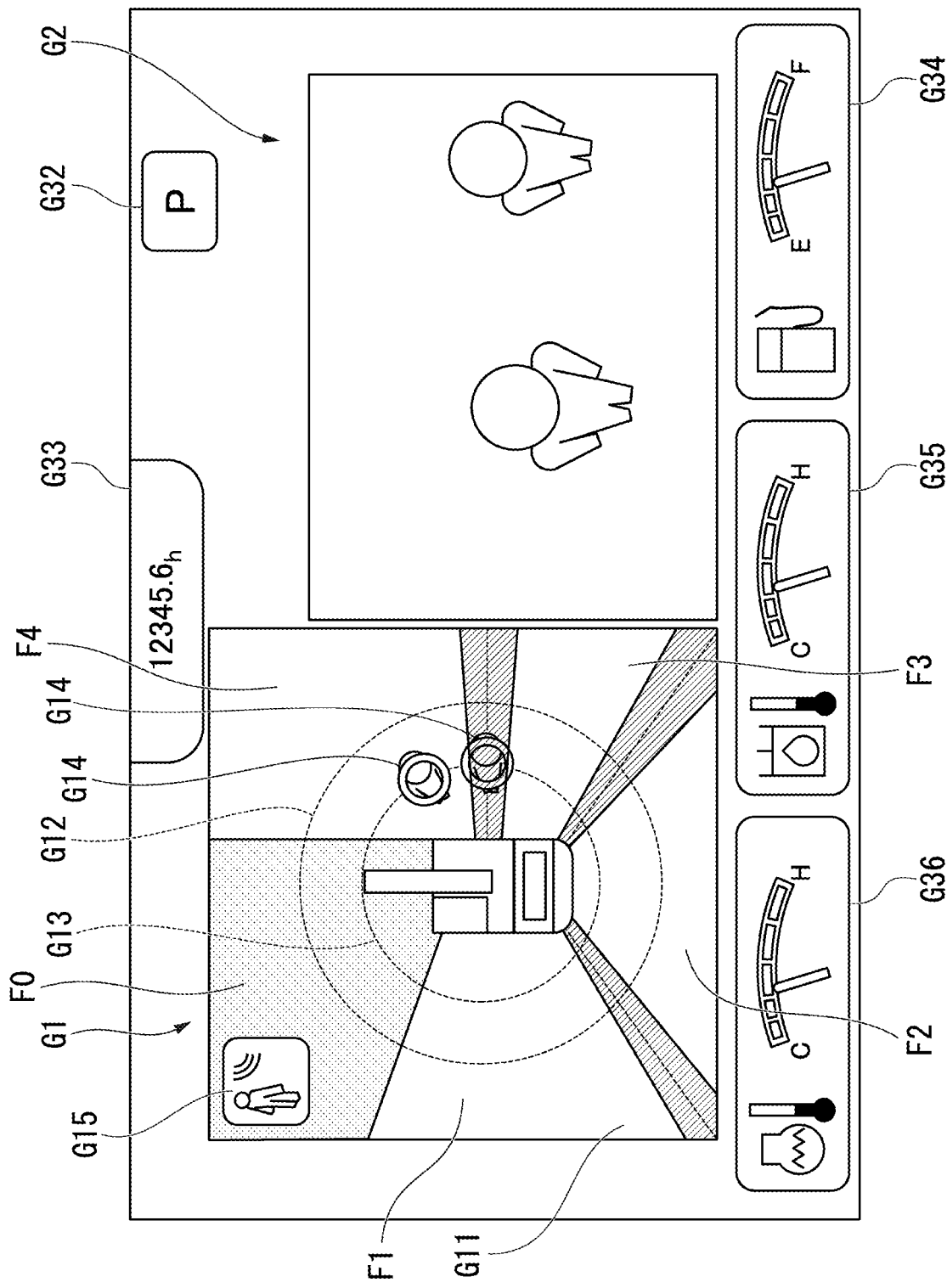
FIG. 12 is an example of a display image according to another embodiment.

FIG. 12 is an example of a display image according to another embodiment.

Imaging ranges may overlap each other in the frame regions F1, F2, F3, and F4. Hatched portions in FIG. 12 are overlapping portions of the imaging ranges which are not to be displayed on an actual screen. For example, in the frame region F3 and the frame region F4, a part of the imaging range of the right rear camera 121C corresponding to the frame region F3 and a part of the imaging range of the right front camera 121D corresponding to the frame region F4 may overlap each other. When the detection accuracy of a person detected in an overlapping portion of the frame regions F3 and F4 is higher than that of a person detected in a portion other than the overlapping portion, the marker G14 may also be disposed at the position of the person detected in the portion other than the overlapping portion.

In addition, when the detection accuracy of persons detected in an overlapping portion of imaging ranges is higher than that of persons detected in a portion other than the overlapping portion, the markers G14 may be disposed at a predetermined number of detection positions in descending order of detection accuracy among a plurality of the persons detected in adjacent frame regions, for example, in the frame region F3 and the frame region F4. In this case, attaching the markers G14 only to the persons detected in the overlapping portion can be prevented.

Incidentally, the case of the overlapping portion of the frame regions F3 and F4 has been described; however, the above process may be performed for any combination of adjacent frame regions among the frame regions F1, F2, F3, and F4.

Incidentally, a detection of a person in an overlapping portion can be determined, for example, by determining a portion where the imaging ranges of adjacent cameras overlap each other, for each frame image, and determining whether or not a person is detected in the overlapping portion.

Figure 13:
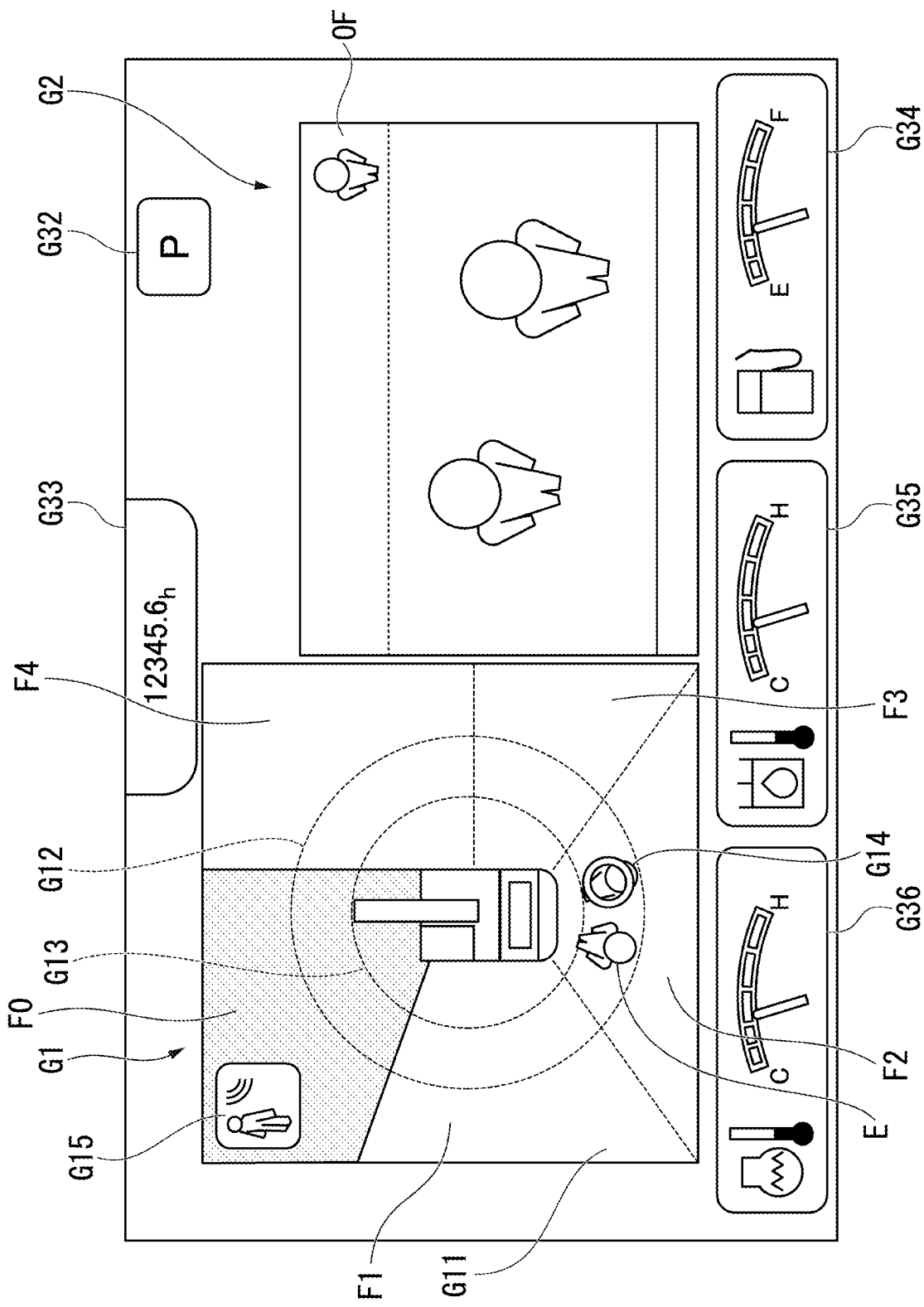
FIG. 13 is an example of correspondence between frame regions of a display image and captured images in another embodiment.

In addition, the imaging ranges of the cameras 121 may be wider than the corresponding frame regions F1, F2, F3, and F4. FIG. 13 is an example of correspondence between frame regions of a display image and captured images in another embodiment.

As shown in FIG. 13, when a plurality of persons is detected in a frame image of the rear camera 121B, a person detected in an outside frame region OF are excluded, and a marker may be disposed at the position of a person having high detection accuracy in the frame image excluding the outside frame region OF. Accordingly, the marker G14 can be prevented from being disposed on the person detected in the outside frame region OF, and the marker G14 is attached to the specified region in which the necessity for monitoring is high, so that necessary information can be immediately determined. Incidentally, the outside frame region OF is a predetermined region in a frame image, and is, for example, a region other than a part of a frame image to be cut out when an overhead image is generated, namely, a region other than the region of the overhead image, which is not displayed in the overhead image.

In addition, when a plurality of persons is detected in a frame image, persons detected outside the caution range may be excluded, and a marker may be disposed at the position of a person having high detection accuracy in the frame image excluding a region outside the caution range. Accordingly, the marker G14 can be prevented from being disposed on the person detected outside the caution range, and the marker G14 is attached to the specified person within the caution range, so that necessary information can be immediately determined.

In addition, in the above-described embodiment, lines of the frame regions F1, F2, F3, and F4 have been described as not being displayed in a display image; however, the invention is not limited thereto. For example, in another embodiment, the lines of the frame regions F1, F2, F3, and F4 may be displayed in a display image.

INDUSTRIAL APPLICABILITY

According to the above disclosure, the display system can reduce the possibility of overlooking necessary information related to the detection of an obstacle.

The invention claimed is:

1. A display system for a work vehicle, the display system comprising a control device that includes a processor and a non-transitory memory, the control device being configured to:
   acquire a captured image of surroundings of the work vehicle;
   detect an obstacle around the work vehicle;
   based on a plurality of obstacles being detected in a region corresponding to the captured image, generate a signal for (i) displaying an obstacle-identifying display at a position related to an obstacle having a detection accuracy higher than a detection accuracy of another obstacle among the plurality of obstacles, the detection accuracy indicating a certainty of presence of the obstacle, and (ii) displaying the another obstacle with no obstacle-identifying display;
   detect whether one or more obstacles of the plurality of obstacles are present (i) within a warning range that is set around the work vehicle or (ii) within a caution range that is set around the work vehicle and outside the warning range; and
   generate a signal for displaying the obstacle-identifying display on a first obstacle that has the highest detection accuracy among the one or more obstacles detected within the warning range even in a case where a second obstacle among the one or more obstacles detected outside the caution range or within the caution range but outside the warning range has a higher detection accuracy than the first obstacle within the warning range.

2. The display system according to claim 1, wherein the control device is further configured to:
   generate an overhead image of the surroundings of the work vehicle based on a plurality of captured images;
   execute a process of detecting the obstacle for each of the plurality of captured images; and
   generate a signal for displaying the obstacle-identifying display on the overhead image at the position related to the obstacle, for each of regions on the overhead image corresponding to the plurality of captured images.

3. The display system according to claim 1, wherein the control device is further configured to:
   generate a single camera image of the surroundings of the work vehicle based on the captured image; and
   generate a signal for displaying the obstacle-identifying display on the single camera image at the position related to the obstacle.

4. The display system according to claim 1, wherein the control device is further configured to generate a signal for displaying obstacle-identifying displays at positions related to a predetermined number of obstacles in descending order of the detection accuracy among the plurality of detected obstacles.

5. A display system for a work vehicle, the display system comprising a control device that includes a processor and a non-transitory memory, the control device being configured to:
- acquire a captured image of surroundings of the work vehicle;
- detect an obstacle around the work vehicle;
- based on a plurality of obstacles being detected in a region corresponding to the captured image, generate a signal for displaying an obstacle-identifying display at a position related to an obstacle having a detection accuracy higher than a detection accuracy of another obstacle among the plurality of obstacles, the detection accuracy indicating a certainty of presence of the obstacle;
- acquire a plurality of captured images of the surroundings of the work vehicle; and
- generate a signal for displaying obstacle-identifying displays at a first position related to a first obstacle and at a second position related to a second obstacle based on a first detection accuracy of the first obstacle detected in an overlapping portion of imaging ranges of adjacent captured images among the plurality of captured images being higher than a second detection accuracy of the second obstacle detected in a portion different from the overlapping portion.

6. A display method for a work vehicle, the display method comprising:
- acquiring a captured image of surroundings of the work vehicle;
- executing a process of detecting an obstacle portrayed in the captured image;
- based on a plurality of obstacles being detected in a region corresponding to the captured image, generating a signal for an obstacle-identifying display at a position related to an obstacle having a detection accuracy higher than a detection accuracy of another obstacle among the plurality of obstacles, the detection accuracy indicating a certainty of presence of the obstacle; and
- generating a signal for displaying obstacle-identifying displays at a first position related to a first obstacle and at a second position related to a second obstacle based on a first detection accuracy of the first obstacle detected in an overlapping portion of imaging ranges of adjacent captured images among a plurality of captured images being higher than a second detection accuracy of the second obstacle detected in a portion different from the overlapping portion.

* * * * *